Inventor
HAROLD COOKSON
By
Attorneys

United States Patent Office 3,412,872
Patented Nov. 26, 1968

3,412,872
MANUFACTURE OF SYNTHETIC
THERMOPLASTIC BOTTLES
Harold Cookson, Hayling Island, England, assignor to The Metal Box Company Limited, London, England, a British company
Filed Apr. 19, 1966, Ser. No. 543,574
Claims priority, application Great Britain, May 6, 1965, 19,209/65
11 Claims. (Cl. 214—1)

ABSTRACT OF THE DISCLOSURE

A device for removing bottles from separable blow moulds having an opening at one end comprises a rotatable arm each end of which carries a bottle engaging device insertable into a bottle in the mould to grip the bottle before the mould is opened. The bottle engaging device includes release means which when the bottle has been moved by the arm to a position remote from the mould engages the bottle and constrains it while the bottle engaging means is disengaged from the bottle.

Background of the invention

Heretofore it has been usual for bottles to be ejected from blow moulds in a random manner and it is an object of the present invention to provide apparatus for removing bottles from a mould in a controlled manner so as to reduce waste in time and handling operations prior to subsequent operations being performed on the bottles.

Summary of the invention

According to the invention there is provided apparatus for removing synthetic thermoplastic bottles from a blow mould having an opening at one end thereof, comprising a conveyor operable to move a bottle-engaging device into and out of a position of alignment with the open end of the closed blow mould after formation of a bottle therein, actuating means co-operable with said device at said position to cause the device to engage and grip a bottle in the mould before opening of the mould, and release means co-operable with said device to release the bottle therefrom at a position remote from the blow mould.

The conveyor may be movable in a circular path and comprise at least one arm rotatable with and extending radially from a rotatable shaft, said bottle-engaging device being supported by said arm for movement therewith and for movement relative thereto by said actuating means.

In an alternative form of the invention the conveyor is movable in a circular path and comprises at least one arm extending radially from a rotatable shaft and secured to the shaft at a position midway between the opposite ends of the arm, and a bottle-engaging device is supported by each end of the arm for movement therewith and for movement relative thereto by said actuating means, said release means being operable to release a bottle from one bottle-engaging device at a position diametrically opposite the blow mould as the other bottle-engaging device is moved towards the opening in the blow mould.

Detailed description of invention

Figure 1:
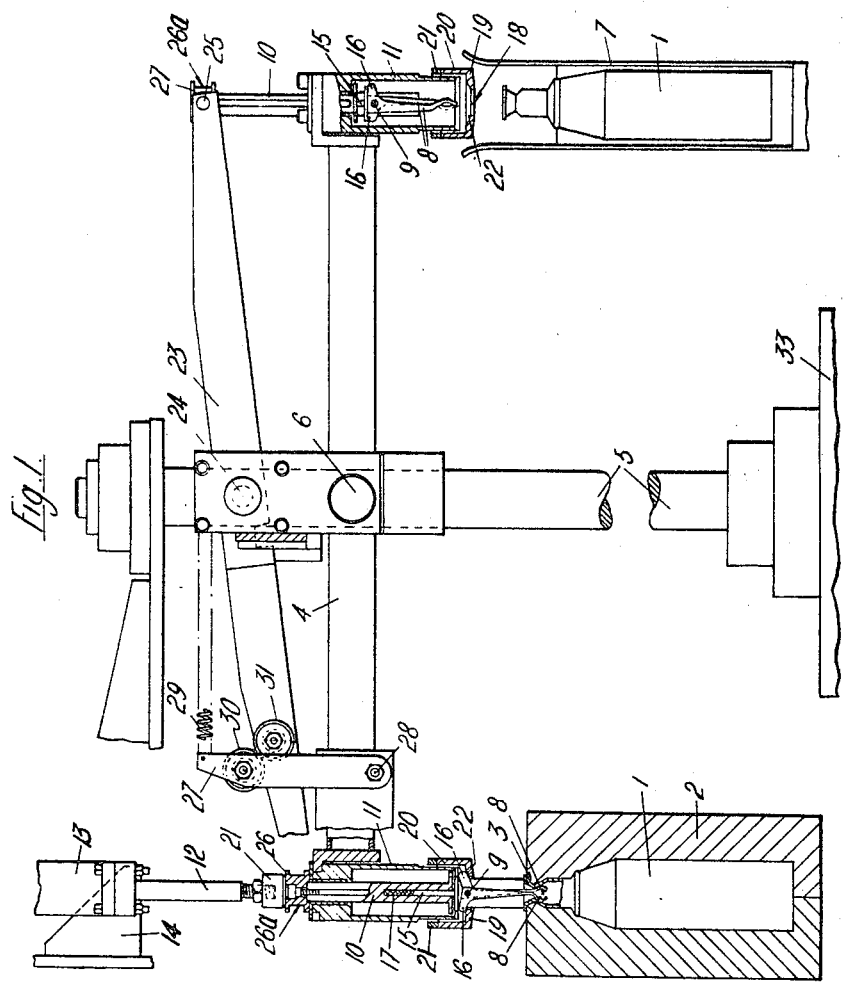
FIG. 1 is a broken elevation, partly in section, of apparatus according to the invention.

Referring to the drawings, synthetic thermoplastic bottles 1 are, in known manner, blown to shape in a closed sectional blow mould 2 having an opening 3 at one end into which a blowing nozzle, not shown, is inserted to effect the expansion of a tubular parison to the shape of the interior of the closed mould. The mould 2 may be one of a plurality of equi-spaced moulds mounted on a rotatable turret for movement to and from a position at which an extruder, not shown, extrudes a tubular parison for enclosing and shaping in a mould.

The apparatus according to the invention comprises a conveyor operable to move a bottle-engaging device into and out of a position of alignment with the open end 3 of the blow mould 2 and actuating means is co-operable with the bottle-engaging device to engage and grip a bottle 1 in the mould 2 before opening of the mould. Release means co-operate with the bottle-engaging device to release the bottle from the device at a position remote from the blow-mould.

As shown in the drawings, the conveyor is movable in a circular path and comprises at least one arm 4 rotatable with and extending radially from a rotatable shaft 5, the bottle-engaging device being supported by the arm 4 for movement therewith and for movement relative thereto by the actuating means. The apparatus shown in the drawings embodies two arms 4, FIG. 2, each extending radially from the rotatable shaft 5 and each arm 4 is secured to the shaft 5 at a position 6 midway between the opposite ends of the arm. A bottle-engaging device is supported by each end of each arm for movement therewith and for movement relative thereto by the actuating means and a bottle receiver shown in the drawings as a chute 7 is located at a position diametrically opposite the blow mould 2. The release means is operable to release a bottle from one bottle-engaging device as the other bottle-engaging device is moved towards the opening 3 in the blow-mould 2 as illustrated in FIG. 1.

Figure 2:
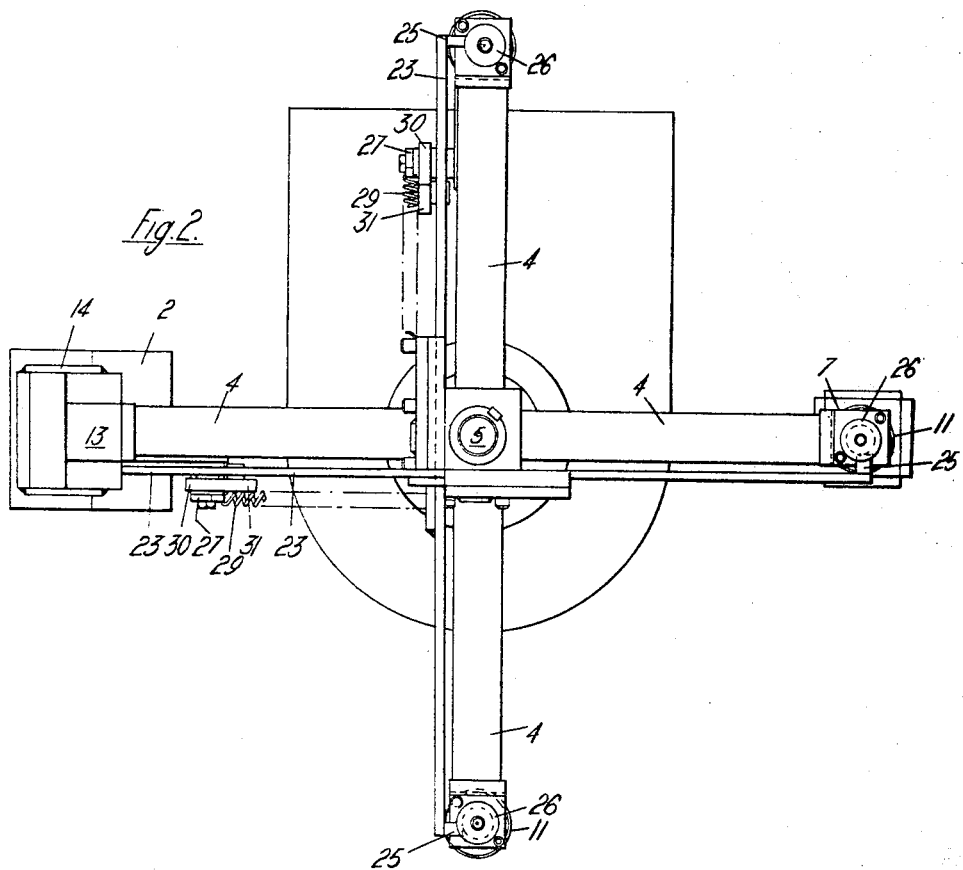
FIG. 2 is a top plan of FIG. 1 with some parts omitted for clarity.

In FIG. 1 each bottle-engaging device comprises a pair of fingers 8 pivoted at 9 for rocking movement relative to a support 10 mounted in a housing 11 carried by an arm 4 for axial movement towards the blow mould 2 by the actuating means which is shown in the drawings as a plunger 12 movable with the piston, not shown, of an air cylinder 13 supported above the mould by a fixed bracket 14. The fingers 8 are biassed to the closed position thereof, as shown at the right-hand side of FIG. 1 above the bottle receiver 7. The fingers 8 are biassed to the closed position thereof by a plunger 15 co-axial with the support 10 and which is located in a bore formed in the support to be movable relative thereto.

A head on the plunger 15 engages wings 16 provided on the fingers 8 and a spring 17 urges the head against the wings 16 to rotate the fingers 8 about pivot 9 to the closed position of the fingers.

When a bottle-engaging device is located above the blow-mould 2 the fingers are in the closed condition thereof and downward movement of the plunger 12 presses the support 10 and closes fingers 8 downwards until the fingers are entered into the neck of the bottle enclosed in the blow mould. As the plunger 12 moves downwards the fingers 8 pass through an aperture 18 in the end wall 19 of a nut 20 screwed on to the lower end of the housing 11 and retained in position by a lock-nut 21, and as the plunger 12 approaches the end of its downward movement the wings 16 engage a camming face 22 formed on the interior of the end wall 19. Engagement of the wings 16 with the camming face 22 causes the fingers to rotate about the pivot 9 thereby to open and grip the interior of the neck of the bottle as shown at the left-hand side of FIG. 1. Accordingly, when the blow-mould is opened the bottle is held by the fingers 8 thus ensuring separation of the bottle from the mould sections. The support 10 is retained in the position to which it is moved by plunger 12, after retraction of plunger 12, by a two-armed lever 23 pivoted at 24 to the shaft 5. Lever 23 is connected to support 10 by a pin 25 located in a groove 26a formed in a collar 26 secured to the support 10 and the lever 23 is retained in the position to which it is moved by plunger 12 by a no dead centre device.

The no dead centre device comprises a lever 27 pivoted at 28 to the arm 4 at a position adjacent to one end thereof, the lever 27 being urged towards the shaft 5 by a spring 29 and carrying a freely rotatable roller 30 which is urged by spring 29 into engagement with a second freely rotatable roller 31 carried by the two-armed lever 23.

When one bottle-engaging device is aligned with the blow-mould 2 the other bottle-engaging device carried by the arm 4 is located above the bottle receiver 7 and the bottle carried by the device is aligned with the bottle receiver 7. Thus as the plunger 12 moves the one support 10 downwards it also moves the other support 10 upwards. The upward movement of said other support 10 causes the bottle neck to be engaged with and arrested by the outer face of the end wall 19. The continued upward movement of the support 10, assisted by spring 17, causes the fingers 8 to be moved to the closed condition thereof and the bottle released from the fingers drops into the bottle receiver 7. It will accordingly be understood that the end wall 19, in addition to opening the fingers 8, also acts as a stripper member which is movable with the bottle-engaging device and is arranged to constrain the bottle against movement with the bottle-engaging device during disengagement of the device from the bottle.

Figure 3:
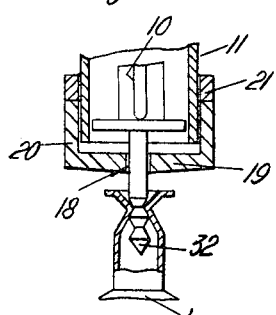
FIG. 3 is a section illustrating a modification to a part of the apparatus shown in FIG. 1.

FIG. 3 illustrates an aternative kind of bottle-engaging device which consists of a spike 32 carried by the support 10, the spike 32 being movable by the support 10 through the mould opening into the neck of a bottle in the closed blow mould and shaped, as shown in FIG. 3, to effect gripping engagement with the interior of the bottle neck.

It is to be understood that the bottle-engaging device may have a form other than that described above, for example it may be a suction device.

Rotation of the shaft 4 is effected in any desired manner, not shown, through an indexing unit 33, FIG. 1, of any suitable kind arranged to time rotation of shaft 5 in relation to the rotation of the turret carrying the blow-moulds 2, and also to control operation of the air cylinder 13. It is also to be understood that, if desired, the plunger 12 may be actuated by means other than an air cylinder, for example the plunger may be operated mechanically, by a hydraulic cylinder, or by a solenoid.

The bottle receiver 7 may be a belt conveyor, or a chute or apparatus to perform a subsequent operation on the bottle.

I claim:

1. Apparatus for removing synthetic thermoplastic bottles from a blow mould having an opening at one end thereof, comprising a conveyor operable to move a bottle-engaging device into and out of a position of alignment with the open end of the closed blow mould after formation of a bottle therein, actuating means co-operable with said device at said position to cause the device to engage and grip a bottle in the mould before opening of the mould, release means co-operable with said device to release the bottle therefrom at a position remote from the blow mould, said conveyor being movable in a circular path and comprising at least one arm extending radially from a rotatable shaft and secured to the shaft at a position midway between the opposite ends of the arm, and a bottle-engaging device supported by each end of the arm for movement therewith and for movement relative thereto by said actuating means, said release means being operable to release a bottle from one bottle-engaging device at a position diametrically opposite the blow mould, as the other bottle-engaging device is moved towards the opening in the blow mould, said release means also comprising a stripper member movable with the bottle-engaging device and arranged to engage a bottle to constrain it against movement with the bottle-engaging device during disengagement of said device from the bottle.

2. Apparatus according to claim 1, wherein each bottle-engaging device comprises a pair of fingers pivoted for rocking movement relative to a support mounted for axial movement towards the blow mould by said actuating means, said fingers being biassed to a closed position thereof to permit movement of the fingers through the mould opening into the neck of a bottle in the closed mould, and finger-opening means arranged to co-operate with said support to move the fingers about the pivot therefor and into gripping engagement with the interior of the bottle.

3. Apparatus according to claim 2, wherein the release means comprises a nut screwed on to the leading end of the mounting for said support, said nut including an apertured end wall through which said fingers are movable by the support therefor and the outer face of which is engageable by a bottle gripped by said fingers as the fingers are withdrawn through the end wall by said support thereby to strip the bottle from the fingers.

4. Apparatus according to claim 3, wherein a camming face formed on the interior of the end wall is engageable by wings provided on the fingers to effect rocking thereof to the neck-gripping positions of the fingers.

5. Apparatus according to claim 4, wherein the fingers are biassed to the closed position thereof by a plunger co-axial with said support, said plunger being carried by the support for axial movement relative thereto and spring-urged against said wings.

6. Apparatus according to claim 1, wherein each bottle-engaging device comprises a spike carried by a support mounted for axial movement towards the blow mould by said actuating means, said spike being movable by the support through the mould opening into the neck of a bottle in the closed blow mould and so shaped as to effect gripping engagement with the interior of the bottle neck.

7. Apparatus according to claim 6, wherein the release means comprises a nut screwed on to the lending end of the mounting for the support, said nut including an apertured end wall through which said spike is movable by the support, the outer face of said end wall being engageable by a bottle gripped by the spike as the spike is withdrawn through said end wall thereby to strip the bottle from the spike.

8. Apparatus according to claim 1, wherein the supports carried at the opposite ends of said arm are connected with the opposite ends of a two-armed lever pivoted to said shaft whereby movement by the actuator means of one support towards the blow mould effects movement of the other support to the position thereof at which a bottle is released from the bottle-engaging device carried thereby.

9. Apparatus according to claim 8, wherein said two-armed lever is retained in the position thereof to which it is moved by the actuating means by a no dead centre device.

10. Apparatus according to claim 9, wherein the no dead centre device comprises a lever pivoted to said arm at a position adjacent to one end thereof a spring urging the lever towards said shaft, and freely rotatable rollers carried respectively by said lever and two-armed lever and urged into engagement one with the other by said spring.

11. Apparatus according to claim 1 wherein said bottle-engaging devices each are carried by a support mounted on the arm for movement therewith and for axial movement towards the mould, and actuating means operable to effect said axial movement of the support to cause the device to engage and grip a bottle in the mould before opening of the mould.

References Cited

UNITED STATES PATENTS 3,144,148   8/1964   Merkner et al. ____ 294—93 XR

FOREIGN PATENTS 681,545   3/1964   Canada.
1,120,970   12/1961   Germany.
509,473   3/1952   Italy.

GERALD M. FORLENZA, *Primary Examiner.*

F. E. WERNER, *Assistant Examiner.*